(No Model.)

W. H. BAKER.
LAP RING.

No. 402,384. Patented Apr. 30, 1889.

WITNESSES,

INVENTOR.
Wm H. Baker
By C. M. Alexander
Attorney,

United States Patent Office.

WILLIAM H. BAKER, OF PONTIAC, MICHIGAN, ASSIGNOR OF ONE-HALF TO SAMUEL W. SMITH, OF SAME PLACE.

LAP-RING.

SPECIFICATION forming part of Letters Patent No. 402,384, dated April 30, 1889.

Application filed December 17, 1888. Serial No. 293,853. (No model.)

*To all whom it may concern:*

Be it known that I, WILLIAM H. BAKER, a citizen of the United States, residing at Pontiac, in the county of Oakland and State of Michigan, have invented certain new and useful Improvements in Links, of which the following is a specification, reference being had therein to the accompanying drawings.

My invention has relation to certain new and useful improvements upon lap-rings or links; and it has for its objects to provide a very simple and durable link, that will be inexpensive in construction and very strong and easily operated in all kinds of weather, as will more fully hereinafter appear.

The invention consists in certain novel features of construction, that will be fully hereinafter set forth, and particularly pointed out in the claim appended.

Figure 1:
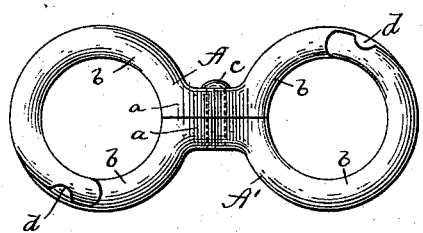
Figure 2:
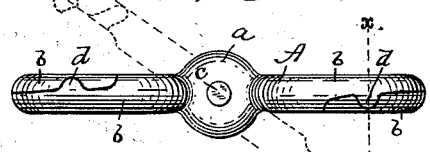
Figure 3:
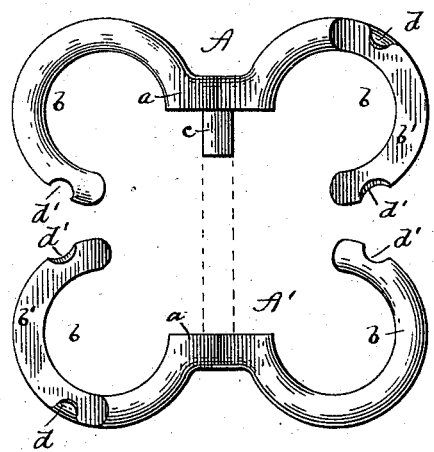
Figure 4:
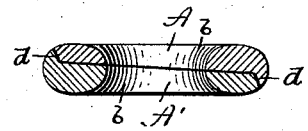

Referring to the accompanying drawings, Figure 1 represents a plan view of my improved link complete; Fig. 2, a side elevation of the same; Fig. 3, a plan view of the link with the sections separated, and Fig. 4 a transverse sectional view on the line $x\ x$ of Fig. 2.

In the drawings, the letters A A' designate the two sections of the link, these sections being constructed alike and cast in one piece. Each section is constructed of a central vertical disk-like portion, $a$, and two oppositely-projecting horizontal rings or hooks, $b\ b$. The sections are pivoted together by a horizontal rivet, $c$, passed through central apertures in the disks $a$, the adjacent faces of the disks being made smooth and flat to permit of a free movement of the sections.

As shown in Fig. 3, the pivot $c$ may be formed integral or cast with one of the sections, if it is so desired. The adjacent faces of the open rings $b$ are flattened, as at $b'$, so that when the link is closed, as in Figs. 2 and 4, each pair of open rings $b$ will form one solid and strong closed ring, as shown, which will present no obstructions or weak places.

Projecting from the flattened face of each portion $b$ is a lug or projection, $d$, which, when the link is closed, fits snugly in notches or recesses $d'$, formed in the faces of the adjacent portions, as shown. The inner faces of these lugs $d$ are preferably beveled, and their outer faces are rounded to preserve the contour of the rings. These lugs and recesses serve to prevent the portions $b$ from straightening out or breaking when subjected to great strain. These lugs also prevent the portions $b$ from moving laterally upon each other.

The advantage derived from forming the lugs and recesses upon the edges of the rings $b$ lies in the fact that it will be impossible for any dirt or gravel to lodge in the recesses, thereby insuring at all times a close fit of the flattened portions $b'$ of the rings $b$. This location of the recesses also prevents any accumulation of water or dampness, and thereby prevents the parts freezing together in cold weather.

What I claim, and desire to secure by Letters Patent, is—

As an improved article of manufacture, a lap-ring consisting of the two sections A A', these sections being pivoted together and constructed each of a disk, $a$, and the oppositely-projecting hook portions $b$, having their adjacent faces flattened and their exposed surfaces rounded, each of the said hook portions having projecting from its outer edge an integral lug, $d$, these lugs fitting in recesses formed in the outer edges of the adjacent hook portions and having their outer or exposed portions rounded to conform to the contour of the rings formed by the said hook portions, substantially as herein set forth.

In testimony whereof I affix my signature in presence of two witnesses.

WILLIAM H. BAKER.

Witnesses:
CHARLES T. TAFT,
JOHN MATHEWS.